US005570811A

United States Patent [19]

Wittern, Jr. et al.

[11] Patent Number: 5,570,811

[45] Date of Patent: Nov. 5, 1996

[54] APPARATUS AND METHOD FOR DISPENSING ITEMS FROM A VENDING MACHINE

[75] Inventors: Francis A. Wittern, Jr., Des Moines; Paul L. Hawkins, Guthrie Center; James L. Denato, Ames, all of Iowa

[73] Assignee: Fawn Engineering Corporation, Des Moines, Iowa

[21] Appl. No.: 332,944

[22] Filed: Nov. 1, 1994

[51] Int. Cl.$^{6}$ ........................................ B65G 59/00

[52] U.S. Cl. ........................ 221/127; 221/231; 221/242

[58] Field of Search .............................. 221/129, 133, 221/116, 97, 242, 241, 279, 226, 232, 231, 298, 301

[56] References Cited

U.S. PATENT DOCUMENTS

| | | | |
|---|---|---|---|
| 1,367,081 | 2/1921 | Olson | 198/463 |
| 1,503,585 | 8/1924 | Headley et al. | 221/242 |
| 2,537,300 | 1/1951 | Casey et al. | 221/231 |
| 2,785,828 | 3/1957 | Patzer | 221/129 |
| 3,055,548 | 9/1962 | Allegri | 221/97 |
| 3,125,246 | 3/1965 | Barnhart | 221/129 |
| 3,753,514 | 8/1973 | Naguet | 221/129 |
| 4,120,393 | 10/1978 | Motooka et al. | 198/460 |
| 4,164,279 | 8/1979 | Dubuit | 198/492 |
| 4,405,059 | 9/1983 | Kull | 221/129 |
| 4,542,834 | 9/1985 | Kurosawa et al. | 221/116 |
| 4,676,398 | 6/1987 | Kokubun et al. | 221/129 |
| 4,757,915 | 7/1988 | Albright et al. | 221/75 |

FOREIGN PATENT DOCUMENTS

| | | | |
|---|---|---|---|
| 6176261 | 6/1994 | Japan | 221/226 |

*Primary Examiner*—Kenneth Noland

*Attorney, Agent, or Firm*—Zarley, McKee, Thomte, Voorhees & Sease

[57] ABSTRACT

A dispensing apparatus and method for vending machines includes in one embodiment a horizontal vending tray with one of more columns. Each column can have one or more tracks. A biasing device such as a spring is associated with a pusher plate that slides along the column. A triggering mechanism at the front of the column is actuated by the rotation of a rod from the back of the column. The triggering mechanism blocks items placed along the track from being pushed off the front of the column to a delivery area but also controls when such dispension occurs. The configuration allows items of different sizes, shapes, and types to be loaded into the column by standing on their bases and therefore allows the column to be easily adapted to dispense a wide variety of items.

24 Claims, 5 Drawing Sheets

APPARATUS AND METHOD FOR DISPENSING ITEMS FROM A VENDING MACHINE

BACKGROUND OF THE INVENTION

A. Field of the Invention

The present invention relates to an apparatus and method for dispensing items from a vending machine, and in particular, to an apparatus and method which can dispense items of varying sizes, shape, and type.

B. Problems in the Art

The vending machine art has a long and varied history. Presently, a wide variety of vending machine types exist. For example, machines that dispense soft drinks in aluminum cans are pervasive throughout society. Businesses and institutions frequently have machines that dispense food, either processed and preserved or fresh, and beverages, either in containers or in cups. Some are refrigerated. A number of different types of machines dispense non-edibles, for example, postage stamps, cigarette lighters, and toothpaste.

Most vending situations have in common the need to have a reliable way to dispense or deliver a selected item to the purchaser. A component receives money or some debit indicator like a token or authorization card and verifies its validity. A component allows the purchaser to select a desired item. If the validation or selection step does not reliably result in dispension of the correct item, and only one of the correct items, it is deficient.

A number of styles and types of money receiving and item selection components exist in the art. Generally, they accept coins, tokens, bills, and even debit cards to instigate the vending process. Electro-mechanical buttons or switches having numbers and/or letters correlated to different items in the vending machine are commonly used to allow the selection of desired items. Presently, the reliability of many of these types of components is quite high. Also, flexibility and correlation of control switch to selected item is relatively straight forward.

A significant deficiency has been recognized, however, in the components which are used to physically dispense items, as opposed to pay for and select items, from vending machines. In general, most delivery systems are product-specific, that is, are structured to uniquely handle a particular type, size, and shape of item. Some examples are as follows.

Candy is many times stored and vended from horizontal trays which are broken up into a number of what will be called columns. Because candy packages tend to be of different shapes, sizes, and configuration (e.g. rectangular boxes, paper packages or bags, plastic containers, paper wrapped), one common delivery mechanism is called a helix. It is basically a helically shaped wire that is positioned along the longitudinal axis of each column. One end of the wire is attached to a motor which can rotate the helix, and like an augur, can move the items (which are placed in-between spaces along the helix) forward. Rotation is controlled so that one item at a time moves to the front lip of the column of the tray and drops off to a delivery area accessible by the customer.

Difficulties with helix-type dispensing mechanisms can include the lack of adjustability of the helix. It is normally fixed in size and thus in the space between coils and its width. Therefore, the size of the containers it can dispense are generally somewhat limited. They are not ordinarily adapted to dispense things like large bottles or cans. Furthermore, the trays that use helixes normally do not pull out to allow easy loading for first in, first out dispension. While helixes dispense in a fashion that allows new product be loaded behind old, generally the fixed helix/motor combination means the reloader has to individually place items correctly along the helix and reach all the way to the back of the tray to do so.

Soft drink cans are many times vended, not by a horizontal tray, but rather an inclined tray or what are called serpentine systems, which rely on gravity to feed the cans to a tripping mechanism which then dispenses the can to an access area. Difficulties with such dispensing systems include more complex dispensing mechanisms to isolate and then release a selected can. This many times requires more motors and structural complexity. There is normally no adjustability for different sized items. The reliance on gravity to push cans forward (a passive system) can also subject the vending machine to problems, such as if a can happens to bind or otherwise get caught in the delivery path, it requires a worker to come to the machine and alleviate the jam.

Gravity feed machines are, on the other hand, beneficial for the reason that the passive gravity action eliminates the need for motors and structures to actively push the items forward. It is to be understood, however, that such systems are not conducive to dispensing plastic containers, especially the increasingly popular plastic soft drink bottles (anywhere from around ten fluid ounces to a liter). If several such plastic containers are positioned in abutment and gravity pushes down on them for delivery to a drop off, such pressure can misshape the plastic containers to the point that they will not vend, for example, one or more will get hung up along the path. Another substantial problem is that the weight behind the bottles (a problem that exists with all gravity feed systems), may force more than one container out at a time out of the dispensing mechanism. There are also stacking difficulties with such containers in these dispensing systems. Different sizes are not usually allowed. Attempts have been made to allow different sized containers to be vended from the same gravity feed tray. However, these usually involve such things as shims that must be manually installed, so that it is time-consuming and does not accommodate quick change-overs.

It can be seen that even though a number of types of vending systems exist in the art, there is still room for improvement. It is therefore a principle object of the present invention to provide an apparatus and method for dispensing items from a vending machine which improves over and solves the problems and deficiencies in the art. Other objects of the invention are to provide an apparatus and method such as described above which allows:

1. a variety of different sized items to be dispensed from the same machine, from the same tray, and even from the same column;

2. each column to have multiple degrees of adjustability to accommodate different sizes, shapes, and types of containers;

3. horizontal dispension from each column to eliminate gravity feed problems;

4. motors associated with the dispension of items to be located in the back of each column, but integrated with the column so that the column could be pulled forward for easy loading;

5. a reliable dispensing trigger mechanism which is adjustable to accommodate a variety of sizes, shapes and types of items, and which can dispense from right or left tracks in each column, if such is desired;

6. the elimination of complex, costly, and space consuming dispension triggering apparatus at the front of the column, which allows more columns or trays to be fit into the vending machine;

7. flexibility in the placement and orientation of the columns to accommodate front or side delivery from the columns.

These and other objects, features and advantages of the invention will become more apparent with reference to the accompanying specification and claims.

SUMMARY OF THE INVENTION

The present invention is an apparatus and method of dispensing items from a vending machine which is generally universal as to the types of items that can be dispensed. The apparatus includes a column that can be used individually or with others in a tray. The column can be oriented generally horizontally. An actuator is positioned at the back end of the column. An extension rod runs along the longitudinal axis of the column to the front of the column. At least one pusher plate, connected to a constant tension spring or other forward biasing device, slides along the tray and pushes items placed in a row in the column to the front. A dispensing trigger mechanism, activated by rotation of the rod, both holds items in the column from being dispensed until selected, and serves as a gate to pass a selected item to the front edge of the column, where it drops to a receiving area.

Some features of the invention include adjustability of any of the width of the columns, the triggering mechanism, and the pushing pressure; elimination of motors or complex triggering mechanisms at the front of the tray; and universality regarding holding and dispensing different types, sizes, and shapes of items.

The method of the invention includes holding various size, shape and type items, by mechanically biasing the items forward, and retaining the foremost items until selected to be dispensed. Also, the invention makes possible bi-directional dispensing of dissimilar products from a column.

BRIEF DESCRIPTION OF THE DRAWINGS

FIG. 8 is a perspective view of the interior of a vending machine showing the vertical adjustability of columns or trays in the vending machine to adjust the head room between columns or trays.

FIG. 10 is an isolated view of the area shown by line 10—10 in FIG. 8.

DETAILED DESCRIPTION OF THE PREFERRED EMBODIMENT

A. Overview

Figure 1:
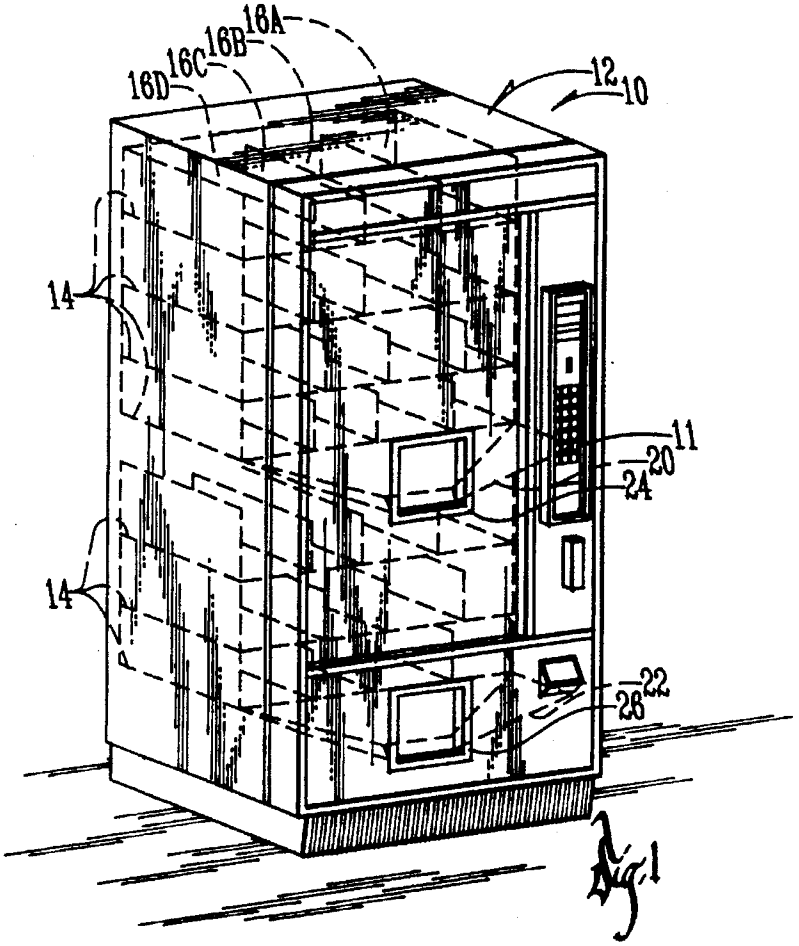
FIG. 1 is a perspective view of a vending machine incorporating dispensing mechanisms according to an embodiment of the invention.

To allow a better understanding of the invention, a specific embodiment will now be described in detail. The following description is given of an embodiment of the invention as an example only. It is not intended to, nor does it, limit the invention to this specific example.

This description will frequently refer to the drawings. Certain parts and locations in the drawings will be given certain reference numerals or letters. The same parts and locations in various drawings will be given the same reference numerals or letters, unless otherwise indicated.

It is to be understood that this description will primarily discuss the embodiment of the invention set up in a manner to dispense things such as soft drink cans and bottles in a vending machine having multiple columns and multiple trays. However, it will be appreciated that the invention can be used as a single column dispenser and in a variety of vending situations and machines. It can even be mixed in with other dispensing systems. The invention also can obviously be used advantageously with a wide variety of items other than soft drink cans and bottles.

B. Structure and Operation

Referring specifically to FIG. 1, there is shown a vending machine 10 including a housing 12. In this embodiment, a plurality of what will be called trays 14 are positioned by means known in the art in spaced relation inside housing 12. Each tray 14 includes a plurality of what will be called columns 16 (shown diagrammatically in FIG. 1; see FIG. 2 for specifics). Each column 16 includes an actuating mechanism (which will be discussed in detail later) that can move products forward and dispense them from the front of each column 16. Vending machine 10 includes a delivery system (shown generally at 20 and 22), which funnels dispensed products from any column to opening 24 or 26 where it can be accessed and retrieved by a customer.

It is noted that the present invention is not limited to any particular type of vending machine. As previously mentioned, in one form the invention can be limited to a single column. However, as depicted in FIG. 1, a plurality of columns can be included in a single tray. In some embodiments of vending machines, columns according to the present invention allow the entire tray or individual columns to be pulled or slid forward out of the vending machine to facilitate easy stocking and maintenance. It is to be further noted that columns according to the present invention are such that they allow columns and trays to be essentially horizontal and that the actuating mechanisms for the columns and trays do not generally extend above or below the top and bottom periphery of each column or tray so that columns or trays could be closely stacked together both vertically and horizontally—which allows more product to be stored per interior cubic volume of vending machine 10.

By referring to FIG. 1, horizontal trays 14 of vending machine 10 of FIG. 1 can include one or more columns 16 for the serial dispension of items or containers (e.g. bottles, cans, candy). A number of trays can be positioned inside housing 12 of vending machine 10. Each column 16 (each section of a tray) can have one or several selections of items. Therefore, several trays, each with several columns, can provide a number of selections for customers. It is to be understood that according to the desire, individual columns can be suspended in position within vending machine 10. Alternatively, individual columns can somehow be tied or connected together such as in trays or otherwise. As will be seen, it is also possible to utilize a single platform with adjustable dividing walls to form multiple columns for each tray.

Figure 2:
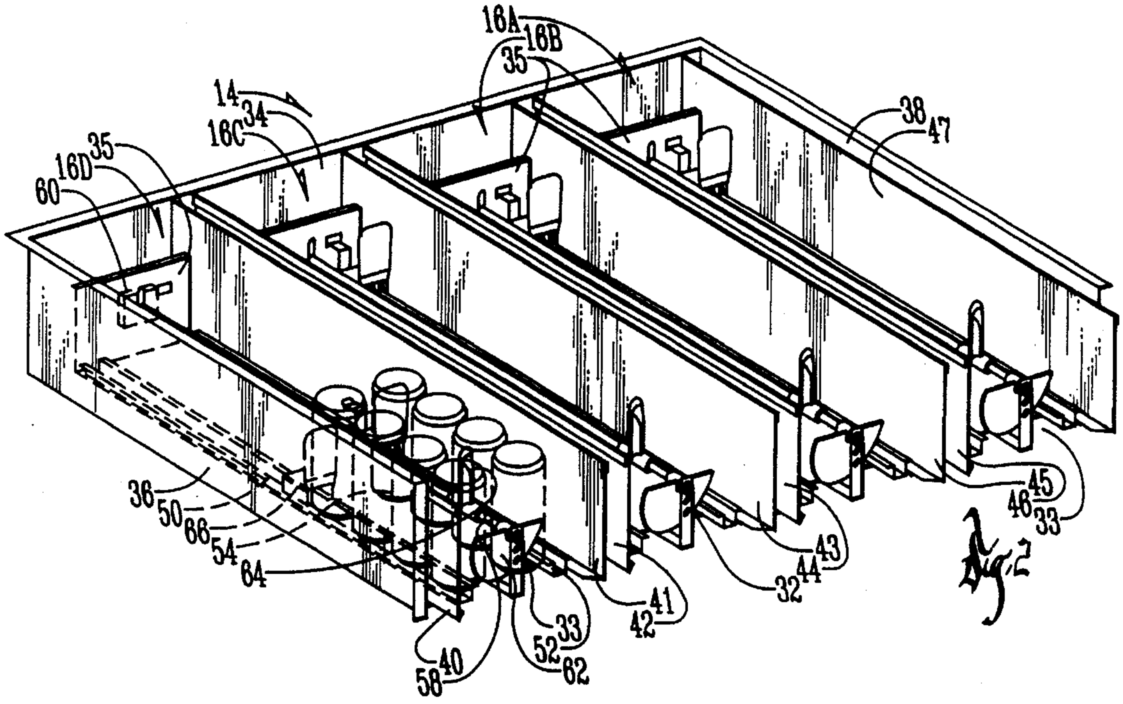
FIG. 2 is an enlarged isolated perspective view of a vending machine tray including a plurality of dispensers according to an embodiment of the invention.

Referring to FIG. 2, a single tray 14 of vending machine 10 is shown in detail. The primary aspect of the invention according to this embodiment is that it takes advantage of one commonality between most vended products—that they usually have a base or some sort of surface which is intended to support the item when it is placed on a surface. For example, soft drink bottles have a bottom base to allow them to be stood upright. It is likewise for most cans and packaged items.

Each tray 14, as shown in FIG. 2, has a floor 32, a back wall 34, and opposite end walls 36 and 38. Additionally, there are intermediate wall sets 40/41, 42/43, 44/45, and 46/47 attached to floor 32 which serve to define the width of each column 16 (shown as 16A, 16B, 16C, or 16D). It is then to be understood that side walls 40 and 41, 42 and 43, 44 and 45, and 46 and 47, are adjustable in spacing with respect to one another to allow adjustability of width of each column 16A, 16B, 16C and 16D.

By referring to FIG. 6, it can be seen that each column 16 also has its own bottom plate 33 and internal end wall 35 that, as will be discussed later, support the actuating system for the column and allows further adjustability and flexibility.

Each column 16 has at least one track (in this embodiment there are two tracks 50 and 52 mounted on top of bottom plate 33 for each column 16) along each of which a series of containers 54 and 56 are placed. Although each column is surrounded by bottom and side walls, the top is open to allow for different height containers. Each set of containers that is placed on a track 50 or 52 will be called a row of containers. The containers in each row are loaded side-by-side.

Figure 3:
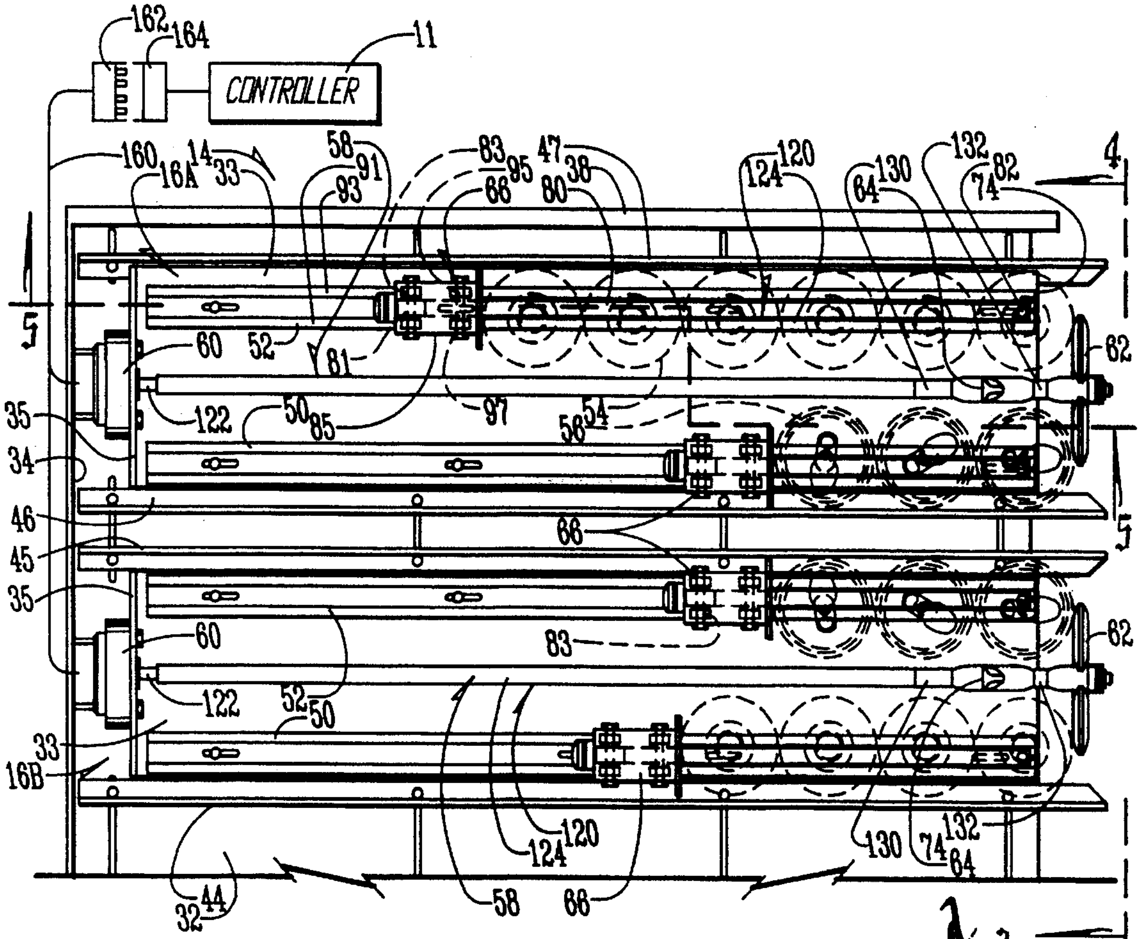
FIG. 3 is a partial top plan view of FIG. 2.
Figure 4:
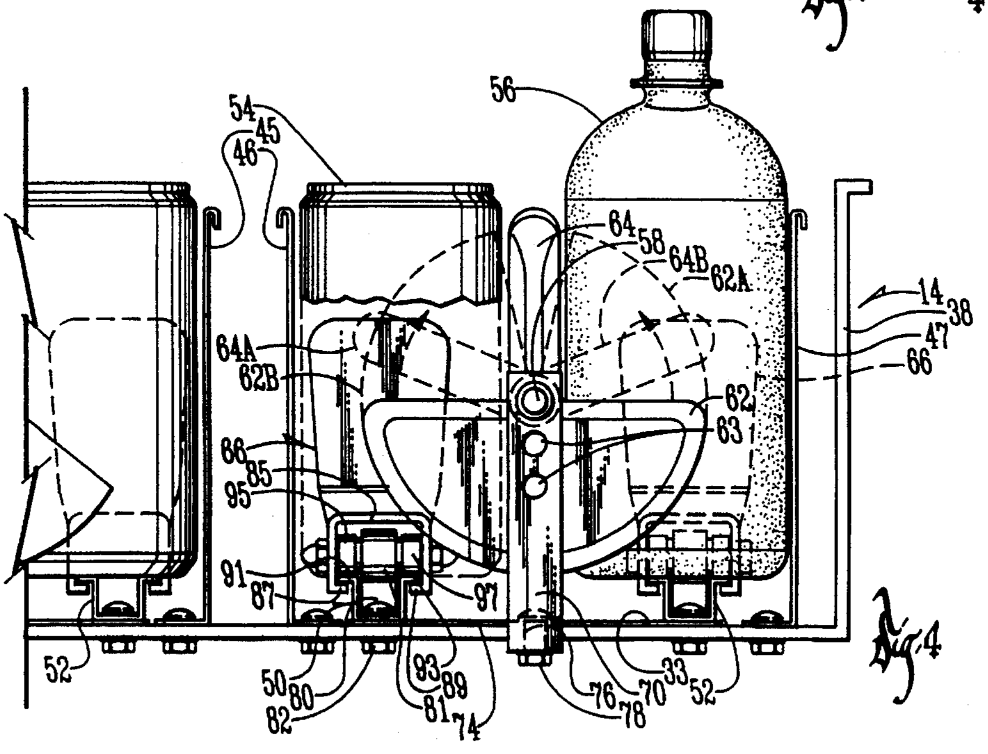
FIG. 4 is a further enlarged front elevational view taken along line 4—4 of FIG. 3.

By referring also to FIG. 3, a rotatable rod 58 extends down the middle of each column 16. A 23 R.P.M., 24 VDC motor 60 is attached to exterior end wall 35 at the back of each column 16 in line with rod 58. A rotating disk or cam 62 is attached to the front of each rod 58. As can be seen in FIG. 4, disk 62 in this embodiment is about 180° of a circle (but can be of different sizes, preferably a segment of a circle). A finger 64 is positioned inwardly along rod 58 from the disk 62. Finger 64 functions to hold back the remainder of containers in a row being dispensed from. During dispension from one row of a column, disk 62 holds the row on the opposite side of rod 58 intact.

Each row of containers is pressed forward towards the front of the column by a continuous tension spring loaded (at 4.5 lbs.) pusher member 66 that travels along each track 50 and 52. It should be noted by reference to FIGS. 2, 3, and 6, pusher member 66 is always forward-biased. In other words, as shown in FIG. 6, pusher members 66 will automatically be drawn towards and abut against the rearmost container in each row and urge that row towards the front of the column. Therefore, if no containers exist in a row of the column, pusher plate 66 will move all the way to the front of the column. It is helpful, however, to be able to move pusher member 66 all the way to the back of the row when loading the row. One feature of this embodiment therefore is the inclusion of a catch 67 attached to pusher member 66 (see FIG. 6). As shown in FIG. 2, catch 67 can resiliently cooperate with opening 68 in end plate 35 to retain pusher member 66 in a held back, rearward position for reloading.

An electronic controller (shown generally at reference number 11 in FIG. 1 and diagrammatically in FIG. 3) connected to each motor 60 controls each motor 60 to in turn control the amount and direction of rotation of each rod 58. A wiring harness 160 can be connected between motors 60 and a connector plug 162 which in turn is releasably connectable to mating plug 164 (electrically connected to controller 11). This arrangement allows individual trays to be completely removed (not possible unless the wiring is disconnected) from the vending machine and electrically disconnected without either difficult dismantling of wiring or alignment and durability concerns if fixed-in-place plugs were used.

The amount of rotation of disk 62 and finger 64 is calibrated so that only one container is allowed to pass finger 64 into the "ready to dispense position" (at the front of each track of each column), and one container is allowed to pass disk 62 and be dispensed.

FIGS. 2–6 illustrate in detail the structure of each column 16. The structure of one column (column 16A) will be described but it is to be understood that the structure of each of the columns 16A, 16B, and 16C is essentially identical.

It can be seen that each track 50 or 52 consists of U-shaped channel of metal or other relatively rigid material that extends longitudinally along column 16A parallel to rod 58. The back end of rod 58 is journalled in slot 59 and connected to motor 60. Bolts extend through slots 61 in end plate 59 to mount motor 60. Thus motor 60 and rod 58 can be adjusted up or down.

An L-shaped bracket 70 connected by bolts underneath the front end of bottom plate 33 of channel 16A extends outwardly and then upwardly with respect to its connection point, and receives and supports the front end of rod 58 so that both ends of rod 58 are supported at opposite ends of each channel 16A. Rod 58 is rotatably secured in any one of the plurality of holes 63 by a bushing or locking component. The front end of rod 58 is therefore also vertically adjustable. Disk 62 and finger 64 are thus attached along rod 58 towards or around the front of channel 16A by set screws or other components.

Figure 5:
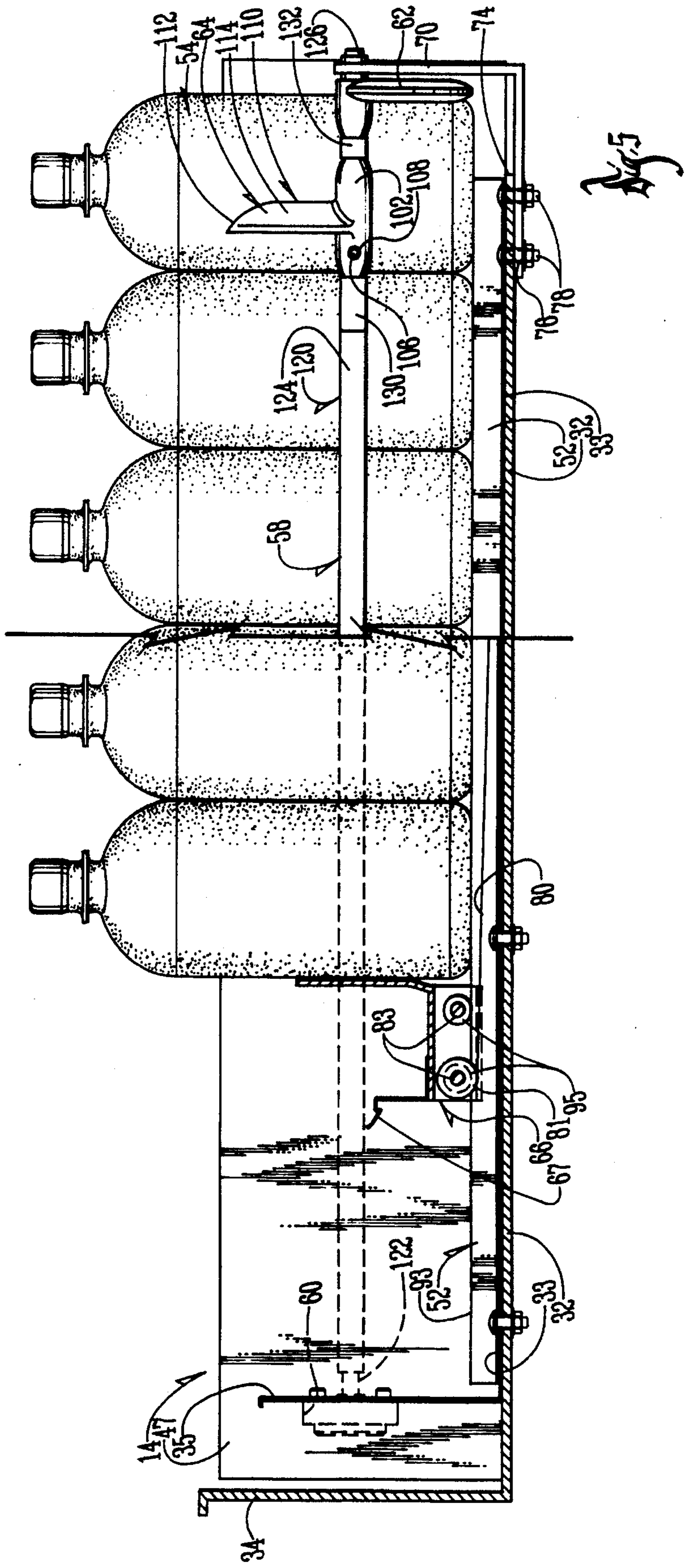
FIG. 5 is a side elevational view taken along line 5—5 of FIG. 3.

By referring to the drawings, and in particular FIGS. 2, 3, 5, and 6, a preferred embodiment of finger 64 is set forth. Referring specifically to FIG. 5, a base 102 has a longitudinal aperture which receives rod 58. A set screw 106 extends into aperture 108 to fix finger 64 along rod 58. Lateral extension 110 is basically perpendicular to base 102 and includes an angled end 112 as well as angled side surfaces 114 and 116. It is to be noted that all surfaces of finger 64 are intentionally rounded to eliminate any distinct or sharp edges to deter any product from getting caught on finger 64 or creating any scraping action against product. In the preferred embodiment, general cross-sectional diameter of base 102 and extension 110 is ⅝ inch and the length of extension 110 is approximately 2 inches from its connection point to base 102. These dimensions can vary, of course, depending on need and desire.

Angled end 112 and angled surfaces 114 and 116 function to cause a gradual exertion of force against the side and rear of a frontmost container being dispensed, until it is moved forward to a position that it falls by gravity from the front of a column. These surfaces allow finger 64 to gradually separate and then in fact push the front most container forward, while holding back the remaining containers in the row. Pusher member 66 no longer exerts a force against the front most container once finger 64 separates the front most container from the remainder of the row.

It is to be understood that both disk 62 and finger 64 rotate with rod 58 but both can be adjustably positioned along rod 58 to accommodate different sized, particularly different cross-sectional diameters, of containers. It is also to be understood that bracket 70 can be slideably positionable with respect to the front of channel 16A. Essentially, the adjustability of disk 62 and finger 64 allows the distance between the front edge 74 of bottom plate 33 and the disk 62 to be adjusted, as well as the distance between disk 62 and finger 64. These features allow fine-tuning with respect to how a container will effectively and reliably drop off the front edge 74 of column 16A for dispension. For example, a container with a larger footprint or cross-sectional diameter may require a bigger distance between front end 74 and disk 62 to allow the container to reliably fall off, than a container with a smaller cross-sectional diameter or footprint. The adjustability of bracket 70 could be by such things as slots in floor 32 through which screws 76 pass into threaded apertures (see FIG. 5).

In the preferred embodiment, however, which is specifically adapted for a range of container sizes that might include, for example, between 6 ounce and 1 liter containers or other size variations, it has been found to be generally sufficient that bracket 70 be kept in a fixed orientation with regard to the front edge 74 of bottom plate 33; that disk 62 be positioned adjacent to a vertical portion of bracket 70, and that a gap exist between vertical portion 70 and front edge 74 of bottom plate 33. Finger 64 is then adjusted along rod 58 (by a set screw or other component) depending on the size of containers for the particular column. For smaller containers, the finger 64 is moved towards disk 62. For larger containers it is moved rearwardly along rod 58. The basic criteria that is found to be workable with regard to location of finger 64 is to place it in a position so that when it rotates towards the container that it will separate and push forward the container. Thus, the thickness of finger 64 must cause forward movement of the container. It is generally been found that the gap between disk 62 and front lip 74 of bottom plate 33 must be such that at least 50% of the footprint of the foremost container be hanging beyond edge 74 so that even a small push by finger 64 will cause dispension of the container. Some trial and error is necessary to determine the best arrangement. Some compromises are also involved if different size containers are utilized in each row and/or in each rows of the column.

It is to be understood, however, that the invention contemplates adjustability of bracket 70, front edge 74, and even tracks 50 and 52, as well as disk 62 and finger 64.

It is therefore possible that with smaller size containers, finger 64 may be substantially aligned with or even in front of edge 74. For medium sized containers finger 64 may be aligned with or slightly behind or rearward from edge 74. For larger size containers finger 64 may be further rearward from edge 74.

FIGS. 3 and 4 in particular show that flat metal springs 80 are fixed by screws 82 to the front end of bottom plate 33 of each channel and extend backwardly inside tracks 50 and 52 to where they are coiled (see reference number 81) around an axle 83 associated with pusher plate 66. A C-shaped-in-cross-section carriage 85 (see FIG. 4) has inwardly extending flanges 87 and 89 which ride under rails 91 and 93 of tracks 50 and 52. Axle 83, rotatably mounted in carriage 85, has wheels 95 and 97 that ride on top of rails 91 and 93. A front axle 94, like axle 83, has wheels 96 and 98 which ride on rails 91 and 93. Carriage 85 thus rides smoothly and captively on rails 91 and 93. Coil 81 of spring 80 provides constant forward biasing of pusher plate 66 towards the front of each column. As can easily be understood, by selection of the type of material of spring 80, and its size and spring characteristics, the amount of force exerted by pusher plate 66 against a row of containers in a column 16 can be adjusted. For example, larger and heavier containers may require more biasing force than smaller lighter containers. It is to be understood, of course, that other types of biasing components could be utilized.

The elevational view of the front end of column 16A in FIG. 4 illustrates the precise relationship of disk 62 to finger 64 for this embodiment and the relationship of pusher plates 66 (left and right) with respect to each row of containers. The normal (non-dispensing) position of disk 62 is shown in solid lines. Disk 62 blocks left and right rows from passing. Ghost lines show that if disk 62 is moved to position 62A (to the right in FIG. 4), finger 64 moves to position 64A (to the left). Conversely, movement of disk 62 to position 62B causes finger 64 to move to position 64B (right or basically opposite).

Figure 6:
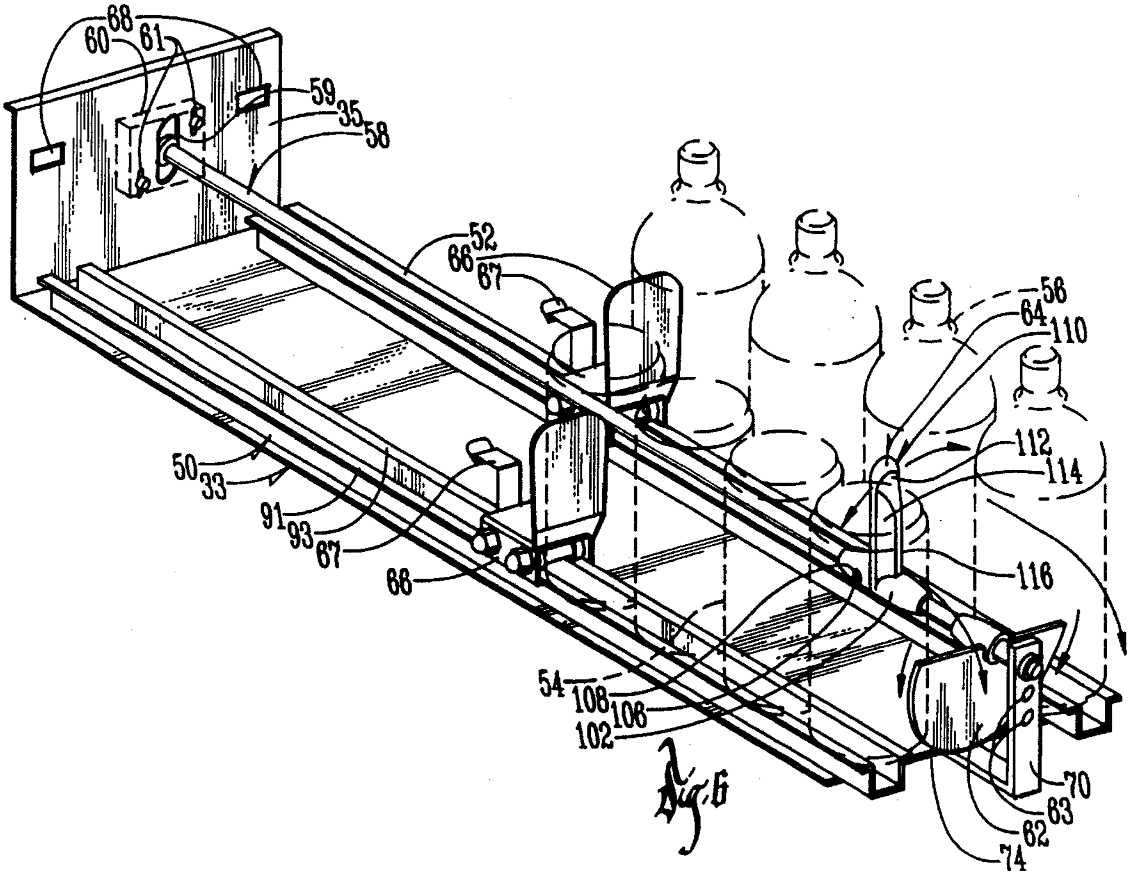
FIG. 6 is an isolated perspective view showing a single column of a tray.

FIGS. 4 and 6 illustrate the operation of column 16A. In each case, two rows of containers (here different sized) are placed base down along tracks 50 and 52. Disk 62 and finger 64 are normally in the position shown in solid lines. By rotation of rod 58, disk 62 and finger 64 can be rotated to either position 62A/64A, or 62B/64B position shown in FIG. 4. Essentially finger 64 is normally straight up. However, when a dispense signal is given to motor 60, finger 64 rotates down in between the first and second containers in the row from which a container is to be dispensed. At the same time disk 62 rotates away from and out of a blocking position of the foremost container in that row. The front container would then by gravity fall off of edge 74 to a dispensing system. In some instances, finger 64 would help push the container off. The relationship of disk 62, front edge 74 and finger 64 must be such that the foremost container will fall off by itself (but that a container cannot fall out if disc 62 is in front of it). Finger 64 would hold the remainder of the row from being pushed forward. It is noted that disk 62 would therefore continue to hold the entire row of containers in the adjacent row in column 16A so that none is dispensed from that side. Once the dispension of the foremost container on the one side is completed, rod 58 would be rotated so that disk 62 returns to a normal position (shown in solid lines) which blocks both rows of containers but the return of finger 64 to its normal position allows the relevant pushing plate 66 to push the remainder of containers in that row up to disk 62. Thus after dispension of a container in one row, the next in line is automatically pushed to the foremost position.

As can be easily appreciated, to dispense the foremost container in either row, rod 58 is simply rotated in the appropriate direction until disk 62 rotates sufficiently away from the container to be dispensed so that it can pass by and fall by gravity off of edge 74.

The distance between disk 62 and finger 64 has to at least roughly correspond to the cross-sectional diameter of the containers being dispensed from both rows. In other words, finger 64 must reliably separate only one container from one side or row of column 16A for dispension and cannot separate more than one. Therefore, while two different sized containers can be dispensed from opposite rows, they must be roughly equivalent in cross-sectional size to allow this to occur. An example of "roughly similar" would be where one container approximately anywhere from three-quarters to the same cross-sectional diameter of the container in the opposite row. Fingers 64 can have their rounded and angled surfaces to help in separating and then holding back the remainder of a row, even if the containers in that row are not precisely spaced between the disk 62 and finger 64.

Motor 60 and any associated electronic controller therefore can be configured to accurately rotate rod 58 to accomplish these purposes.

Figure 7:
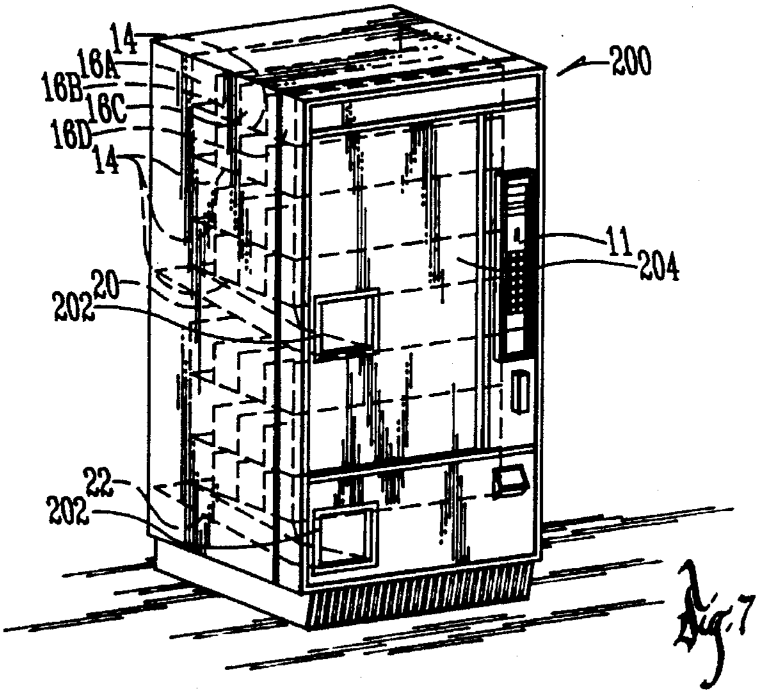
FIG. 7 is a perspective view of an alternative embodiment of a vending machine utilizing dispensers according to an embodiment of the invention.

FIG. 7 merely diagrammatically depicts a vending machine 200 that contains a plurality of trays 14 with columns 16 as previously described. However, because trays 14 can be disposed horizontally within vending machine 200, there is flexibility as far as which way they are oriented with respect to the front 204 of machine 200. In this instance, they are configured so that containers are discharged at the side of machine 200 and then fall into a dispensing mechanism that can direct the container to access outlets 202 in the front of machine 200. Other orientations of trays and/or columns, and access outlet(s) are, of course, possible.

By referring to FIGS. 3 and 5 an alternative embodiment of a drive rod for each column is shown. It performs the same function as rod 58 as previously described except rod 120 of FIG. 3 and 5 has a squared rear end 122 which could directly be inserted into a motor having a square female output opening. The middle length 124 of rod 120 would have a rounded exterior to eliminate scraping or snagging by any squared edges. Forward end 126 would again be squared exteriorly in cross-section for the following purpose. Finger 64 could have a square channel to receive squared forward end 126 of rod 120. This would eliminate the use of a set screw to make the connection of fingers 64 rigid to rod 120. As previously explained, because finger 64 may need to be moved axially along rod 120 depending on the size of containers being dispensed, one or more spacers such as 130 and 132 could be utilized in various combinations with finger 64 to establish its position along rod 120. For example, spacers 130 and 132 on opposite side of finger 64 would center finger 64 along forward end 126 of rod 20. Alternatively, only spacer 132 could be inserted in front of finger 64 to move it rearward along rod 120. Two spacers 130 and 132 could be inserted rearwardly in finger 64 to move it forwardly along rod 120. Additional spacers could be utilized in any combination to adjust the position of finger 64 along rod 120.

Figure 9:
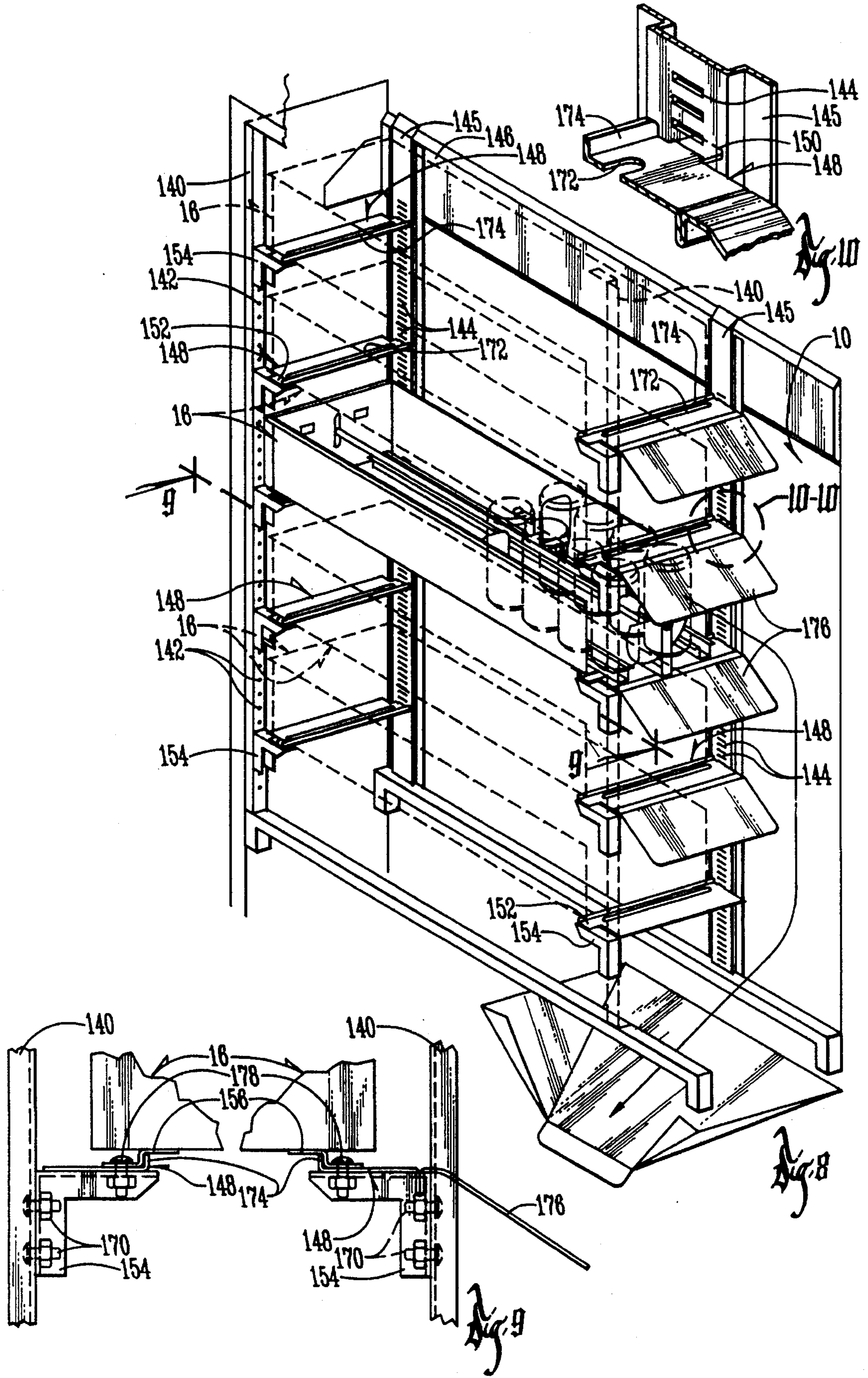
FIG. 9 is a sectional view taken along line 9—9 of FIG. 8.

FIGS. 8–10 illustrate another optional feature that could be utilized with the present invention. As previously described, a primary advantage of the present invention is to minimize any structure that extends substantially above or below each column to allow minimization of head room between vertical trays or columns. The interior of vending machine 10 could include vertical facing supports 140 having spaced apart apertures 142. Slots 144 could be spaced apart vertically along back wall 146 (or alternatively along separate supports 145).

The embodiment shown at FIG. 8 differs somewhat from that shown in FIGS. 1 and 2. Single columns 16 are stacked vertically in a front portion of machine 10. Thus, a plurality of single columns such as shown in FIG. 6, could be placed in front of the machine, here showing five vertically stacked columns, each having the potential of two different selections, at least. Thus, for example, specialty items of various sizes could be dispensed from a very compact and efficient use of space in front of the machine, whereas the remainder of the machine could be used for high volume items such as canned beverages like soda pop. It is to be understood, however, that the present system could be adopted for many different configurations of columns or trays, including those which are forward dispensing as opposed to side dispensing. A primary advantage of the vertical mounting system shown in FIGS. 8–10 is that with the ability to dispense different sized containers, comes the requirement that different spacings exist between vertical trays or columns. A degree of fine adjustability of vertical height between trays or columns would allow maximization of space in the machine; in other words headroom between columns or trays and the items being dispensed from the columns or trays could be minimized between each column or tray and any column or tray above or below.

As can be seen in FIG. 8, each column rests on tracks 148 (two for each column 16), having tabs 150 (see also FIG. 10) and front ends 152, could be installed at desired heights into vending machine 10 by inserting tabs 150 into slots 144 at equal vertical heights and then installing L-shaped brackets 154 into corresponding apertures 142 along supports 140 so that the top surface of brackets 154 are at equal heights to the slots 144 into which tabs 150 are placed. Thus, essentially like drawer rails, each tray or column 16 has runners 156 to match tracks 148. Each column 16 is therefore supported upon tracks 148 at a height that is adjustable vertically based upon the distance between slots 144 and apertures 142. By referring to FIG. 9, it can be seen that brackets 154 are fixed to vertical supports 140 through apertures 142 by bolt and nut combinations 170. The rear of tracks of 148 (bearing tabs 150) are then inserted into the correlated slots 144 in supports 145. The front ends 152 of tracks 148 then are laid on top of the top surface of brackets 154 so that they are generally horizontal and parallel and are fixed there by bolt/nut combination (not shown). Each track 148 has a slot 172 and a upwardly extending edge 174 that extend longitudinally along tracks 148. Note that the right side track 148 may include a deflector plate 176 to assist in diverting dispensed objects out and away from the dispensing hardware of column 16 beneath that from which the item is being dispensed.

What will be called runners 156, are welded or otherwise secured to the bottom of column 16 and are spaced apart to match the lateral spacing between tracks 148. Runners 156 are Z-shaped in cross-section having a middle portion that is closely adjacent to or even abuts and is parallel to the edge 174 of tracks 148 when column 16 is installed on tracks 148. A simple bolt and nut combination 178 can then be inserted through an aperture in runners 156 and then through slot 172 for each runner and track combination so that each column 16 is secured and supported in a selected vertical position inside machine 10, but each column 16 can be pulled forwardly by bolt, nut combination 178 moving in slots 172 and runners 156 cooperating with tracks 148.

FIG. 10 shows in more detail how tab 150 is inserted into a slot 144 in support 145. It is to be understood that vertical supports 140 and supports 145 could be bolted to, welded, or otherwise fixed to the interior of machine 10 by means well within the skill of those skilled in the art. This type of variable vertical spacing can allow very precise positioning of trays vertically with respect to one another to the extent head room between the same is minimized to maximize the amount of product that can be put into the machine. This is especially important with the present invention whereby containers of different sizes and heights can be vended from the same machine, and indeed from the same columns and rows. Thus, uniformity and vertical spacing of trays is inefficient as far as maximization of space inside vending machine 10. The slideability of trays is an important feature for easy loading and unloading and for maintenance. The present invention also cooperative with a wiring harness 160 (depicted schematically at FIG. 3) to have a plug 162 which is mateable with a plug 164 which is connected to the control circuitry that controls operation of motors 60. The wiring harness 160 would remain plugged in as the tray is slid outwardly and rearwardly. However, to completely remove the tray, requires only the unplugging of plug 162 from 164.

It is to be understood that the above described vertical spacing system for columns or trays can be used effectively with the dispensing mechanisms also described previously. It is to be understood, however, that the vertical adjustment features could be used without the precise dispensing mechanisms disclosed herein.

C. Options, Features and Advantages

As can be seen, the preferred embodiment allows at least:

1. serial dispension of containers forwardly or to side of vending machine.

2. containers to be loaded standing up, not on their side because there is not reliance on gravity to dispense (a base for standing on a surface is the one thing most vended containers have in common—today the shapes of containers vary tremendously, e.g. 12 oz. cylindrical cans, 16 oz. long neck bottles, 20 oz. short neck bottles, frusto-conical yogurt cups, etc.).

3. a whole tray to be pulled out of refrigerated vending machine—an important aspect of easy loading and the ability to put the newest product in the back of the tray so that the oldest product is dispensed first.

4. the same or different sized containers to be placed in the same tray.

5. use of mechanical pressure (not gravity) to urge each row of containers towards the separator and disk.

the 6. disk, as the tripping mechanism, to use:

a. a motor in the back which gives more head room between vertically stacked trays (the prior art usually has to place motors underneath the trays).

b. the motors in the back which frees up more vertical space in the vending machine so that sometimes a whole additional tray can be fit into the machine.

c. a DC or reversible motor—allowing the disk to dispense either the left or right container in the column.

d. a shaft to extend from the rear motor along the column to the disk at the front which serves to separate the two rows of containers (can be different sized) in the column.

e. the disk to rotated less than 180 degrees to dispense a container.

f. the separating member to basically trap the front-most containers in each row and prepares them for dispension—generally working oppositely of the disk.

g. the controller to instruct either left or right rotation of the disk for left or right dispension from a column; left or right dispension doubles the amount of possible choices from the tray (see FIGS. 5–6).

h. the side walls of the columns to be width-adjustable for different sized containers—this allows efficient spacing so that sometimes an extra column or row of choices per tray is possible.

i. the disk's distance from the separator to be adjustable for different sized containers—to allow large containers and small containers to be dispensed.

j. the ability to have horizontal trays allows more full trays to be fit into a machine housing of a given size, and allows multiple dispension ports in the housing, rather than a single port at the bottom, which makes it hard to reach the dispensed product and also allows the trays to be fit into the housing front-to-back or in the side.

It will be appreciated that the present invention can take many forms and embodiments. The true essence and spirit of this invention are defined in the appended claims, and it is not intended that the embodiment of the invention presented herein should limit the scope thereof.

We claim:

1. A dispensing apparatus for vending machines comprising:

a bottom support having front and back ends;

side retainers on opposite sides of the bottom support;

a pusher plate slideable between the front and back ends of the bottom support;

a forward biasing device connected to the pusher plate;

a dispensing member at the front end of the bottom support;

an actuator at the back end of the bottom support;

an extension member connected between the dispensing member and the actuator;

the dispensing member comprising a cam positioned along and rotatable with the extension member around an axis, a portion of the cam having a width that extends a substantial distance laterally between the side retainers, and a separating finger positioned along the extension member rearwardly from the dispensing member rotation of the cam opening or blocking a pathway for items placed on the bottom support to be dispensed out of the column.

2. The apparatus of claim 1 wherein the side retainers are adjustable laterally with respect to each other.

3. The apparatus of claim 1 wherein the pusher plate is slideable on a carriage which is captured in a track along the bottom support.

4. The apparatus of claim 1 wherein the biasing member comprises a spring.

5. The apparatus of claim 4 wherein the spring comprises a band spring having one end connected near the front end of the bottom support and having an opposite end attached to the pusher plate.

6. The apparatus of claim 1 wherein the dispensing trigger is a segment of a circle, the segment being generally less than 180°.

7. The apparatus of claim 1 wherein the actuator is an electrical motor with a rotatable output shaft.

8. The apparatus of claim 1 wherein the extension member is a rod.

9. The apparatus of claim 1 wherein the separating finger is positioned on the extension member at a spaced apart location behind the trigger mechanism, the separator member comprising a portion extending laterally from the extension member and having a length that separates and blocks an item succeeding an item being dispensed. The separating finger having an angled end to first abut and then to forwardly move the item being dispensed.

10. The apparatus of claim 1 wherein the cam comprises a portion substantially all of which extends on one side of a plane through the extension member and the separating finger extends generally oppositely away from the portion of the cam.

11. A method of dispensing items from a vending machine comprising:

placing a plurality of items side by side along an axis along a generally horizontal support, the plurality of items along the axis including an item in a forwardmost position and an item in a rearwardmost position;

biasing the item in the rearwardmost position forwardly along the axis;

blocking the item in the forwardmost position with a blocking. member;

rotating the blocking member to unblock the item in the forwardmost position to dispense that item; and rotating the blocking member to reblock the item succeeding into the forwardmost position;

further comprising a second plurality of items, spaced apart from but generally parallel to the plurality of items, and placed side by side along a second axis along the generally horizontal support, the second plurality of items along the axis including an item in a forwardmost position and an item in a rearwardmost position, and wherein the blocking member blocking both items in both forwardmost positions when in a blocking position, blocking one forwardmost position and unblocking the other forwardmost position when in a first dispensing position, and blocking the other forwardmost position and unblocking the one forwardmost position when in a second dispensing position.

12. A dispensing apparatus for the dispension of any of a variety of different size, shape, and type of items where each of the items can be stood up on a base comprising:

a column having a front end, a back end, and a longitudinal axis and comprising a floor and walls on opposite sides of the axis;

first and second tracks along the floor spaced apart but parallel to the axis and upon each of which the base of successive items to be dispensed can be placed;

a push member approximately at least as wide as the distance between the first and second tracks moveable between positions near the back end and the front end of the column;

a forward biasing member connected to the push member;

an electric motor positioned near the back of the column;

a support positioned near the front of the column;

a rod rotatably mounted between the support and the motor;

a control plate fixedly mounted on the rod near the support and rotating with rotation of the rod, substantially all of the control plate extending below a plane through the point of connection of the control plate to the rod so that upon rotation of the control plate to a first blocking position, the control plate blocks passage of items on both the first and second tracks, rotation of the control plate in one direction opens the passageway for an item on one of the first and second tracks, and rotation of the control plate in an opposite direction opens the passageway for an item on the other of said first and second tracks.

13. The apparatus of claim 12 wherein the walls are adjustable towards and away from one another.

14. The apparatus of claim 12 wherein the control plate comprises less than 180° of a segment of a circle.

15. The apparatus of claim 12 wherein the control plate has a widest width which is less than the distance between the walls but more than one-half the distance between the walls.

16. The apparatus of claim 12 further comprising a separator member mounted to the rod rearwardly of the control plate approximately the width of one item.

17. The apparatus of claim 16 wherein the separator comprises a portion extending generally laterally from the rod oppositely from the control plate.

18. The apparatus of claim 12 wherein the first and second tracks are adjustable forward and rearward.

19. The apparatus of claim 12 further comprising a vending machine housing including an interior, vertically spaced connections in the interior of the housing, tracks to slideable support a column, the tracks including connectors to mount the tracks at a desired vertical heights in the housing.

20. The apparatus of claim 19 further comprising a plurality of columns, each having connections and rails so that the plurality of columns can be mounted in the housing minimizing spacing between columns.

21. An apparatus for the vending of one of two selections with a single gating member in a tray that is generally horizontally disposed comprising:

an elongated channel having a longitudinal axis, adjustable sidewalls on opposite sides of the axis, and a rotatable rod positioned generally along the axis between a back end and a dispensing end of the channel;

a connection member on one end of the rod for connection to a motor at the back end of the channel to rotate the rod upon a selection instruction;

a support member at the other end of the rod for rotatably supporting the other end of the rod at the dispensing end of the channel;

a gating member adjustably positioned along the rod near the dispensing end of the channel, the gating member comprising a rotatable portion extending substantially on one side of a plane through the rod;

a retention member adjustably positioned along the rod a distance from the gating member towards the back end of the channel, the retention member comprising a rotatable portion extending substantially on an opposite side of the plane through the rod from the rotatable portion of the gating member.

22. The apparatus of claim 21 wherein a plurality of channels are mounted in a tray in a vending machine.

23. The apparatus of claim 22 wherein a plurality of trays are mounted in a vending machine.

24. An apparatus for allowing vertical adjustability between items being dispensed in a vending machine comprising:

one or more supports for items to be vended, each support having a length and width;

first and second tracks;

vertical surfaces within the vending machine, each vertical surface having a plurality of spaced apart track-mounting locations;

mounting members to removably fix the tracks at desired vertical heights;

first and second runners attachable to each support for the vendible items matching the location of the tracks in the vending machine housing;

so that a support can be vertically supported at variable vertical heights within the vending machine housing but can be slid away from a normal position for reloading and maintenance.

* * * * *